June 9, 1959
D. D. WALKER
2,890,053
DIAPHRAGM CHUCK
Filed Nov. 7, 1957
2 Sheets-Sheet 2
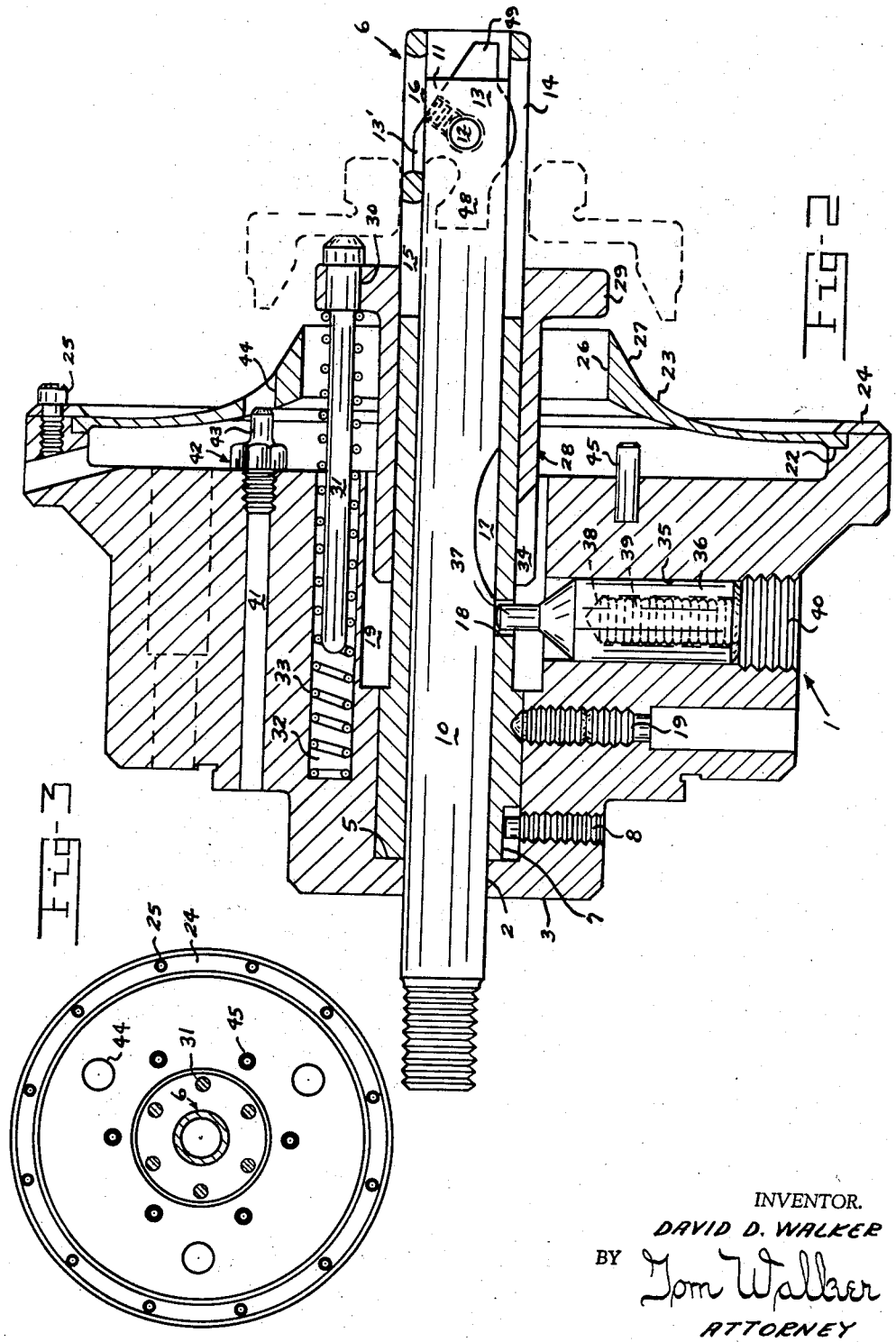
INVENTOR.
DAVID D. WALKER
BY Tom Walker
ATTORNEY

United States Patent Office 2,890,053
Patented June 9, 1959

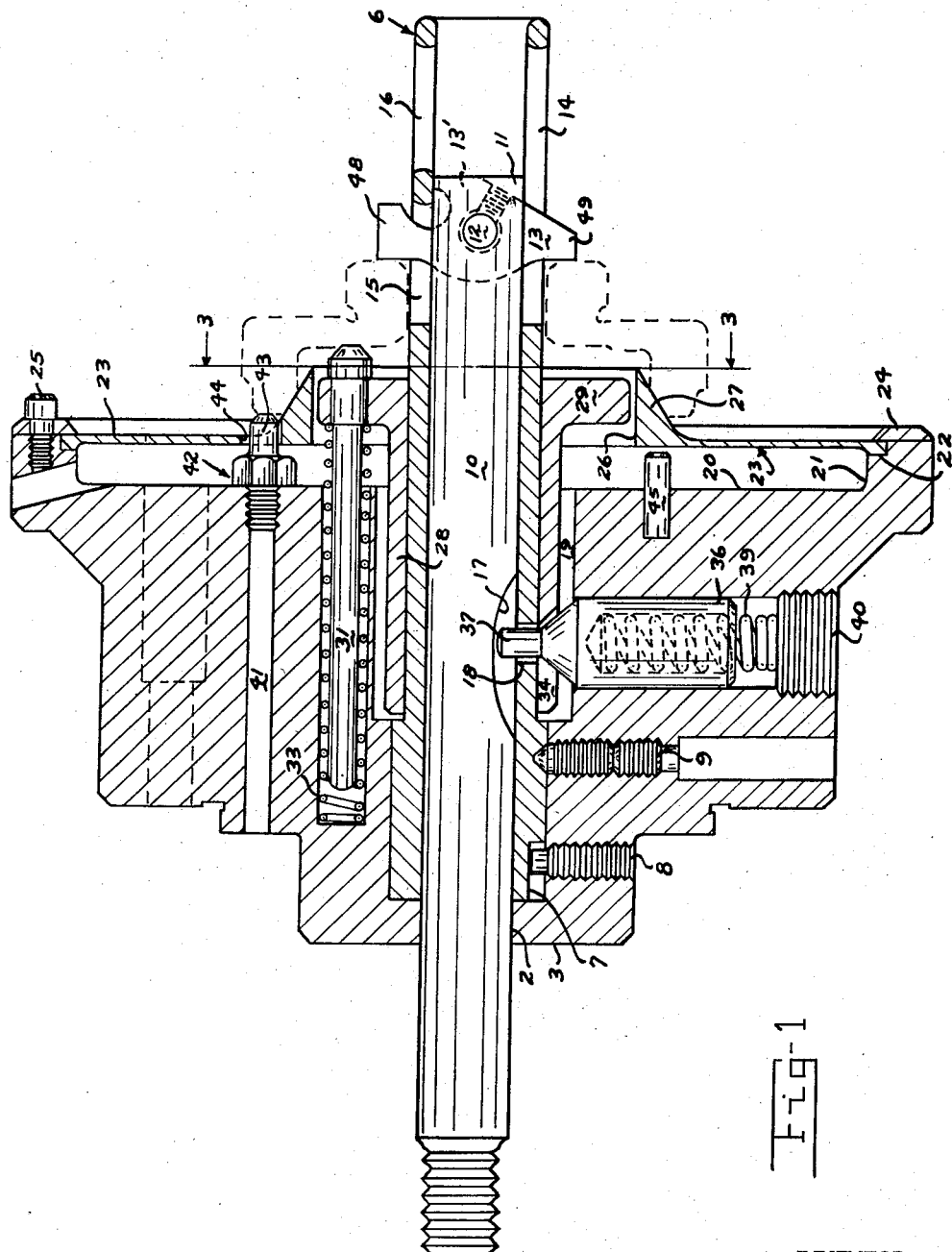

2,890,053

DIAPHRAGM CHUCK

David D. Walker, Dayton, Ohio, assignor to Garrison Machine Works, Inc., Dayton, Ohio, a corporation of Ohio Application November 7, 1957, Serial No. 695,004

15 Claims. (Cl. 279—1)

This invention relates to chucks and more particularly to automatic draw bar operated chucks of an improved nature.

A primary object of the invention is to simplify the construction as well as the means and mode of operation of chucks whereby they may not only be economically manufactured, but will be more efficient and satisfactory in use, adaptable to a wide variety of application and be unlikely to get out of repair.

Chucks are generally fabricated for specific applications. Precision chucks, for example, are generally adapted for particularly sized and shaped work pieces. Many other work pieces have different bore diameters and in order to provide for the same a number of chucks must be employed and substituted as required. The invention is directed to improvements in chucking devices so as to reduce chucking problems to an absolute minimum and to enable a single chuck to be readily adapted to serve a multitude of applications.

In the first place, the subject invention provides a chuck assembly which can be simply modified to accommodate work pieces having different bore diameters without the need for removal of the chuck from the machine. The invention further provides a chuck assembly with a diaphragm which is novelly employed in centering work pieces as they are chucked. The diaphragm automatically compensates for any reasonable differences in size bore from one part to another. Other improvements are afforded by the invention which will be readily apparent from the invention embodiment illustrated herein.

Another object of the invention is to provide an improved chuck employing a resiliently mounted diaphragm for centering a work piece.

Another object of the invention is to provide an improved chuck particularly adaptable to work pieces having different bore diameters by a simple modification thereof.

An additional object of the invention is to provide an improved chuck for work pieces having a taper bore employing resiliently mounted diaphragm means to center work from a smooth taper surface which automatically compensates for any reasonable differences in the size of the taper bore from one part to another.

A further object of the invention is to provide improvements in draw bar operated chucks which reduces the necessary capital investment in chucks to an absolute minimum.

A further object of the invention is to provide a chuck possessing the advantageous structural features, the inherent meritorious characteristics and the mode of operation herein described.

With the above primary and other incidental objects in view as will more fully appear in the specification, the invention intended to be protected by Letters Patent consists of the features of construction, the parts and combination thereof, and the mode of operation as hereinafter described or illustrated in the accompanying drawings or their equivalents.

Referring to the accompanying drawing wherein is shown one but not necessarily the only form of embodiment of the invention, Fig. 1 is a cross sectional view of a chuck in accordance with the invention showing a work piece chucked thereto;

Fig. 2 is a view similar to Fig. 1, but showing the finished work piece in the process of being ejected; and Fig. 3 is an elevation of the chuck assembly illustrated in 1 and 2 taken along line 3—3 of Fig. 1.

Like parts are indicated by similar characters of reference throughout the several views.

Invention can be best described with reference to the embodiment illustrated in the drawings. A chuck housing 1 is provided which is axially apertured in stepped fashion to provide a minimum internal diameter 2 immediately adjacent its rear face 3. The external diameter of the housing 1 is also at a minimum adjacent the rear face 3 and expands in stepped fashion to its chucking face.

The internal diameter of the housing 1 is expanded immediately forward of the section 2 to provide an annular shoulder 5. A generally cylindrical clamping tube 6 is mounted coaxially within the housing 1 to have one end abut the shoulder 5 and its other end project forwardly from the housing. The abutting end of the tube 6 has an enlarged external diameter of such size as to provide a friction fit with the inner wall of the housing 1 immediately forward of the section 2.

A keyway 7 is cut inwardly of tube 6 from its abutting end and a stud 8 threadedly engages through the wall of the housing 1 and into the keyway 7 to prevent rotative movement of the clamping tube relative the housing. A set screw 9 is provided which is recessed and extends radially inward of the housing 1 for adjustment to and from a clamping engagement with the peripherally expanded portion of the clamping tube 6.

A drawbar 10 mounts coaxially within the housing 1 to bear within the section 2 and the clamping tube 6 for reciprocation relative thereto. The forward end 11 of the drawbar is bifurcated. This bifurcation is bridged by pivot pin 12 which pivotally mounts a clamping finger 13. The tube 6 is provided with a longitudinal slot 14 in the undersurface of its projecting extremity while diametrically opposed thereto are spaced slots 15 and 16. The slots 14 through 16 accommodate the clamping finger 13 in its various operating positions as will be further described.

Intermediate the length of the drawbar 10 its peripheral surface is provided with an arcuate recess 17 which in the forward most position of the drawbar is immediately forward of an aperture 18 in the wall of the clamping tube 6. The internal diameter of the housing 1 is expanded forwardly of the portion accommodating the inner end of the clamping tube 6 to provide a cylindrical cavity 19 about the clamping tube extending to a point adjacent to and spaced from the outer or operating face of the chuck housing 1. From this point the internal diameter of the housing is substantially expanded to provide an annular face 20 immediately adjacent the operating face and facing outwardly of the housing 1. The face 20 is peripherally defined by a cylindrical wall 21 which is slightly expanded at the outer face of the housing to provide a shoulder 22 facing outwardly thereof. A diaphragm 23 over the outer open face of the housing 1 has its periphery seated to the annular shoulder 22 and clamped thereto by an annular plate 24 seating over the outer face of the housing 1 with its inner periphery in overlying relation to the peripheral edge of the diaphragm. Screws 24 serve to fix the plate 24 to the housing 1.

The diaphragm 23 has a substantial central aperture 26 defined by an extended circular portion 27 which is externally tapered in conical fashion.

Mounted within the cavity 19 in housing 1 and in bearing relation to the tube 6 is a cylindrical shedder sleeve 28 externally expanded at its outer end 29, which is adapted to move outwardly of the housing 1 and within the aperture 26 in the diaphragm for purposes to be described. Circularly spaced apertures 30 are provided in the expanded portion 29 of the sleeve 28 adjacent its periphery. Rods 31 extend through apertures 30 to have enlarged heads abut the outer end surface of sleeve 28 while their projecting ends nest within axial recesses 32 in the face 20. Coil springs 33 about rods 31 abut the inner most surface of the expanded sleeve portion 29 to one end and the base of the recesses 32 to their other end to tend to bias sleeve 28 outwardly of the housing 1 and through the aperture 26 in the diaphragm 23. The sleeve 28 is notched at 34 inwardly from its innermost end in alignment with the aperture 18 in tube 6.

A radial bore 35 is provided in the housing 1 in axial alignment with the aperture 18 in tube 6. A trigger element 36 mounted in the bore 35 is conically reduced adjacent its inner end which has a cylindrical pin-like extension 37 adapted to lie within the aperture 18. The outermost extremity of the element 36 is axially recessed at 38 to seat a coil spring 39. An externally threaded nut 40 is engaged in the outermost extremity of the bore 35 over the outer end of the element 36 to apply an inward bias thereto through the spring 39.

The housing 1 is provided with axially directed apertures 41 opening to the face 20. Rest buttons 42 having radial enlargements intermediate their ends seat to the face 20 to have their inner ends threadedly engaged in the apertures 41. The outer extremities 43 of the rest buttons are relatively reduced to project through circularly spaced apertures 44 in the diaphragm 23 on chucking of a work piece. Pins 45 are also seated in the face 20 to project therefrom in an axial sense to limit the inward movement of the diaphragm.

To fully understand the advantages and benefits of this embodiment of the invention, reference is made to Fig. 2 of the drawings wherein parts of the chuck are shown in a forward most position to receive a work piece having a taper bore. It should be noticed that at this point the finger 13 is positioned coaxially within the tube 6 with the draw bar in its forwardmost position. The finger 13 has a hook extension 13' horizontally disposed and abutting the forward surface of the tube section separating slots 15 and 16 while extensions 48 and 49 thereon are oppositely directed in an axial sense within the tube 6. In this position of the elements the sleeve 28 is also in its projecting position under the influence of the springs 33 and it will be noticed that there is a slight outward bias of the inner periphery of the diaphragm 23 towards the element being chucked. Further, the draw bar maintains the projecting end of the trigger 36 within the aperture 18 in the clamping tube. As the work piece is applied over the projecting end of the tube 6, automatically or otherwise, its tapered bore accommodates the enlarged head of the shedder sleeve 28 to have the heads of the pins 31 engage its inner face. As the work piece is moved inwardly to the housing, the springs 33 are compressed thereby and the taper bore receives the tapered projection of the diaphragm 23 which automatically nests therein and resiliently accommodates a slight axial movement of the work piece therewith to effect a stabilizing and a complete and firm centering thereof. As the work piece is thus seated, the rest buttons 42 project through the apertures 44 in the diaphragm to abut the innermost surface of the work piece and limit its inward movement. The limit pins 45 limit the inward movement of the diaphragm. In addition, the draw bar moves rearwardly aligning recess 17 and the aperture 18, whereupon the trigger 36 is biased within the recess to lock the shedder 28 in its retracted position. In the retraction of the draw bar, the finger 13 is pivoted in a clockwise direction due to the engagement of the portion 13' with the section of the tube intermediate slots 15 and 16. This disposes the finger extension 48 to project through a slot 15 and the opposite extension 49 to project through slot 14 to prevent forward displacement of the work piece and to lock it to the diaphragm thereby.

To reject the work piece when it is finished, the draw bar is moved forward to cam the trigger into the aperture 18 and the finger 13 is cammed within the tube 6 in the process in a manner believed obvious. This frees the piece which is automatically ejected by the shedder 28 under the influence of the springs 33.

Thus, a chuck assembly is provided which clearly illustrates the advantages and benefits of the invention. The annular diaphragm centering device is simple yet very positive in function and readily adapts to varying work pieces to completely control their position for working thereof. Moreover, the tube 6 can be easily replaced by tubes having different external diameters. This enables a single chuck to be mounted to a machine and a number of different sized tubes provided which readily interchange to adapt the chuck for work having different bore dimensions.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A chuck including, a chuck housing having an operating face, a diaphragm over said operating face having an integral conical projection normally biased forwardly from said operating face for engaging in a bore of a work piece being chucked to positively fix its position to said housing.

2. A chuck including, a housing, resilient means mounted to the chucking surface of said housing projecting in a relatively biased condition and integrally formed to interengage and frictionally guide a work piece to a centered position as it is chucked.

3. The structure as set forth in claim 2 wherein rest buttons are fixed to the chucking surface of said housing for limiting the seating of a work piece thereto, and means in said housing operative to lock the work piece to said rest buttons and said integrally formed resilient means.

4. A chuck including, a chuck housing, said housing being axially apertured, a tube having a slip fit coaxially within said housing for guiding a work piece thereto, a draw bar bearing in said housing and within said tube, means releasably mounting said tube in said housing for ready interchangeability, lock means pivotally mounted to said draw bar, means mounted to the chucking face of said housing for centering a work piece as it is guided thereto on said tube, said draw bar being operable to initiate the locking action of said lock means for fixing the work piece to said housing as it is centered, the interchangeability of said tube enabling the chuck to be readily adapted to accommodate work pieces having different bores.

5. A chuck including, a housing having a recessed operating face, a draw bar extending coaxially through said housing, a clamp tube about said draw bar inwardly of said housing and projecting forwardly from its operating face to guide work pieces to be chucked, said draw bar having means projectable and retractable relative said tube on reciprocation thereof for selectively locking a work piece to said housing on chucking or releasing it, and an annular diaphragm type centering element connected to the operating face of said housing about said tube formed to guide and center the work piece as it is chucked.

6. A chuck including, a centrally apertured chuck housing having a chucking face, the central aperture being internally expanded providing a shoulder facing outwardly of said chucking face, a clamp tube having a slip fit in said housing to said shoulder and projecting outwardly of said chucking face to guide the work piece being chucked, draw bar operated means within said tube and operable to selectively lock the work piece chucked to said housing and means releasably fixing said tube to said shoulder whereby said tube may be readily interchanged to accommodate the size and shape of the work piece being chucked.

7. A chuck including, a chuck housing having an operating face, a centrally apertured diaphragm having a formed circular projection to its outer surface peripherally connected to said housing over its operating face, bearing means connected to said housing and projecting through the aperture in said diaphragm for receiving work pieces to be chucked and directed thereby to frictionally engage and be centered by said formed circular projection on said diaphragm, and means mounted to said housing for locking the work piece to said diaphragm, which resiliently stabilizes the position of the work piece in the process.

8. The structure as set forth in claim 7 characterized by said bearing means being slip fit in said housing, and means releasably connecting said bearing means to said housing whereby the same chuck may be adapted to chuck work pieces having different bore diameters by ready replacement of said bearing means.

9. Apparatus for chucking a work piece having a taper bore including, a housing having a chucking face, an annular plate peripherally fixed to said chucking face with at least its inner periphery spaced therefrom, said plate having its inner periphery formed to conically project outwardly relative said chucking face, bearing means projecting through said plate for directing work pieces having a taper bore thereto for sliding engagement over the conically projecting inner periphery of said plate, and means mounted to said housing for locking the work piece to said plate which stabilizes and fixes its position in a centered condition in the process.

10. A draw bar operated chuck including, a housing having an operating face, a tubular bearing seated in said housing and projecting from its operating face for guiding work pieces thereto, centering means on said operating face, a draw bar element extending through said housing and reciprocable in said tubular bearing, said draw bar element having a lock finger selectively operative on reciprocation thereof to project radially outward relative said bearing for locking a work piece to said housing or to extend coaxially to free the work piece, a recess in the periphery of said draw bar element, an aperture in said bearing adapted to align with said recess on a predetermined retraction thereof, a radial bore in said housing aligned with said aperture, a pin mounted in said bore seating biasing means to its outer end and means fixed to said housing over the outer end of said pin and biasing means, the inner end of said pin being normally biased in said aperture thereby whereby on alignment of the recess in said draw bar element with said aperture the pin will bias therein, and shedder means to eject the work piece locked to an ineffective position by said pin as it enters said recess.

11. A draw bar operated chuck including, a centrally apertured chuck housing having bearing means slip fit therein to project from its chucking face, a draw bar bearing in said housing and said bearing means for reciprocation relative thereto, centering means on said chucking face for centering work pieces, lock means on said draw bar disposed substantially coaxially therewith when projected forwardly of said chucking face to permit work pieces to be applied over said bearing to said chucking face, an arcuate recess in the body of said draw bar, means defining aligned apertures in said bearing and said housing radially related to said draw bar, trigger means in said aligned apertures biased to said draw bar, means at the outer extremity of said apertures adjustably connected to said housing to maintain the bias of said trigger means whereby on retraction of said draw bar within said housing said lock means will fix a work piece delivered to the chucking face of said housing and said recess will be aligned with said trigger means which will bias therein, and shedder means to eject the work piece locked to an ineffective position by said trigger means as it enters said recess.

12. A diaphragm chuck including a body presenting an operating surface, a centrally apertured diaphragm mounted on said surface, means on said diaphragm to center a work piece having a face applied thereto, the application of such work piece flexing said diaphragm, and a draw bar extending longitudinally through said diaphragm and having a part engageable with an opposite face of the work piece, said bar being retractable to hold the work piece to the diaphragm, said diaphragm and said part cooperating resiliently to clamp the work piece in a centered position.

13. A diaphragm chuck according to claim 12, characterized by spring actuated shedder means loaded by an approaching motion of the work piece relatively to said diaphragm and latched against release in response to a retracting motion of said draw bar, said shedder means being released in response to an extending motion of said draw bar.

14. A diaphragm chuck including a body providing a through longitudinal opening, a retractable and extensible draw bar extending therethrough, means to mount a diaphragm on said body centrally apertured to pass said draw bar therethrough, outwardly facing means on said diaphragm to be engaged by advance of a work piece over said draw bar towards said diaphragm in one direction, and means utilizing the reactant pressure of the diaphragm to clamp the workpiece between said diaphragm and the draw bar.

15. A diaphragm chuck according to claim 14, characterized in that said last named means includes a part on said draw bar positioned in response to a retracting motion of said bar to hold the workpiece in pressural contact with the diaphragm.

References Cited in the file of this patent

UNITED STATES PATENTS

| | | |
|---|---|---|
| 1,412,170 | Dixon | Apr. 11, 1922 |
| 2,473,380 | Ljunggren et al. | June 14, 1949 |
| 2,778,649 | Klem et al. | Jan. 22, 1957 |
| 2,820,641 | Garrison et al. | Jan. 21, 1958 |